(12) United States Patent
Peng (10) Patent No.: US 8,500,893 B2
(45) Date of Patent: Aug. 6, 2013

(54) SHIP FLUE GAS SCRUBBING EQUIPMENT AND METHOD

(76) Inventor: Sigan Peng, Wuhan (CN)

( * ) Notice: Subject to any disclaimer, the term of this patent is extended or adjusted under 35 U.S.C. 154(b) by 123 days.

(21) Appl. No.: 12/304,751

(22) PCT Filed: Jun. 13, 2008

(86) PCT No.: PCT/CN2008/071304
§ 371 (c)(1),
(2), (4) Date: Jun. 30, 2010

(87) PCT Pub. No.: WO2009/149602
PCT Pub. Date: Dec. 17, 2009

(65) Prior Publication Data
US 2010/0266472 A1    Oct. 21, 2010

(51) Int. Cl.
*B01D 53/14* (2006.01)

(52) U.S. Cl.
USPC .................. 96/266; 96/290; 95/211; 95/229

(58) Field of Classification Search
USPC .................. 96/296; 95/199; 423/243.01, 22
See application file for complete search history.

(56) References Cited

U.S. PATENT DOCUMENTS

| | | | | |
|---|---|---|---|---|
| 3,285,711 A | * | 11/1966 | Stanford | 422/168 |
| 3,733,777 A | * | 5/1973 | Huntington | 95/181 |
| 3,781,407 A | * | 12/1973 | Tatsuo et al. | 423/243.03 |
| 3,785,121 A | * | 1/1974 | Phelps | 95/263 |
| 3,899,099 A | | 8/1975 | Oiestad | |
| 3,929,434 A | | 12/1975 | Nelson | |
| 4,085,194 A | * | 4/1978 | Otani et al. | 423/243.03 |
| 4,197,278 A | * | 4/1980 | Gehri et al. | 423/243.08 |
| 4,337,230 A | | 6/1982 | Ellestad et al. | |
| 4,455,339 A | | 6/1984 | Meier | |
| 4,999,172 A | * | 3/1991 | Simons | 423/226 |

(Continued)

FOREIGN PATENT DOCUMENTS

CN    2220590 Y    2/1996
CN    2346494 Y    11/1999

(Continued)

OTHER PUBLICATIONS

Dr. Ida-Maja Karle, et al., "Seawater Scrubbing—Reduction of Sox Emissions from Ship Exhausts," The Alliance for Global Sustainability, Goteborg 2007, ISBN: 978-91-976534-1-1.

(Continued)

*Primary Examiner* — Duane Smith
*Assistant Examiner* — Pankti Patel
(74) *Attorney, Agent, or Firm* — Nixon Peabody LLP; Joseph Bach, Esq.

(57) ABSTRACT

This invention involves a marine ship flue gas scrubbing equipment and scrubbing method. The equipment includes a shell with an upper scrubbing section and a water tank in the lower section. A smoke pipe leads in exhaust gas to an area between the scrubbing section and water tank. Scrubbing seawater is injected through an inlet above the scrubbing section, and a cooler is located along the pathway of the exhaust gas. The method of scrubbing includes leading-in exhaust gas, cooling the exhaust gas, injecting scrubbing seawater, performing scrubbing operation, and discharging clean gas. Embodiments of the invention provide a highly efficient scrubbing equipment and method suitable for high-temperature exhaust gas within a limited usable space. The methods and equipment are highly effective for emission reduction, has low energy consumption, small size, and long life performance.

7 Claims, 6 Drawing Sheets

U.S. PATENT DOCUMENTS

| | | | |
|---|---|---|---|
| 5,316,737 A * | 5/1994 | Skelley et al. | 422/170 |
| 5,558,818 A * | 9/1996 | Gohara et al. | 261/17 |
| 5,690,899 A | 11/1997 | Makkinejad et al. | |
| 6,214,065 B1 * | 4/2001 | Berg | 48/197 R |
| 6,217,839 B1 * | 4/2001 | Hess et al. | 423/243.01 |
| 6,284,208 B1 | 9/2001 | Thomassen | |
| 6,402,816 B1 | 6/2002 | Trivett et al. | |
| 6,726,748 B2 * | 4/2004 | Goode et al. | 95/199 |
| 7,056,367 B2 | 6/2006 | Trivett | |
| 7,226,572 B1 * | 6/2007 | Keller et al. | 423/573.1 |
| 2006/0251559 A1 | 11/2006 | Schleicher et al. | |
| 2008/0044335 A1 | 2/2008 | Anttila et al. | |
| 2009/0257932 A1 | 10/2009 | Canari et al. | |

FOREIGN PATENT DOCUMENTS

| | | |
|---|---|---|
| CN | 1236663 A | 12/1999 |
| CN | 2431943 Y | 5/2001 |
| CN | 2569893 Y | 9/2003 |
| CN | 101104130 A | 1/2008 |
| CN | 101288823 A | 10/2008 |
| EP | 1857169 A1 | 11/2007 |
| EP | 1857169 A1 * | 11/2007 |
| EP | 1857169 A1 * | 11/2007 |
| JP | 63-256117 A | 10/1988 |
| JP | 07-185305 A | 7/1995 |
| JP | 2007-222763 A | 9/2007 |
| JP | 2007-263078 A | 10/2007 |
| WO | WO 92/08541 A1 | 5/1992 |
| WO | WO 99/44722 A1 | 9/1999 |
| WO | WO 2006/018911 A1 | 2/2006 |
| WO | WO 2008/029397 A1 | 3/2008 |
| WO | WO 2008/029398 A1 | 3/2008 |
| WO | WO 2009/149602 A1 | 12/2009 |
| WO | WO 2009/149603 A1 | 12/2009 |

OTHER PUBLICATIONS

International Search Report for PCT/CN2008/071304 dated Mar. 19, 2009.

* cited by examiner

SHIP FLUE GAS SCRUBBING EQUIPMENT AND METHOD

FIELD OF THE INVENTION

This invention involves a marine ship flue gas scrubbing equipment and scrubbing method. It employs seawater to scrub and reduce sulfur dioxide and other pollutants discharged by marine ships. It belongs to the field of environmental protection, and more specifically, to the field of ships' exhaust pollutant prevention and control.

DESCRIPTION OF RELATED ART

In the past 20 years, international legislation about air pollutant reduction, mainly the sulfur dioxide pollutant reduction, is getting stricter and more mature. In recent years the restriction target ranges from land-based facilities to marine ships.

After the sulfur dioxide reduction issue was brought out world widely, the trend that value the seawater flue gas desulphurization (FGD) technology appeared soon. In 2007, a scholarly research publication from the Alliance for Global Sustainability (involving four universities: Massachusetts Institute of Technology, University of Tokyo, Chalmers University of Technology, and Swiss Federal Institute of Technology Zurich,) titled, 'Seawater Scrubbing—reduction of SOx emissions from ship exhausts,' ISBN: 978-91-976534-1-1, concluded that, using the ocean resource, that is, the seawater, to realize ship $SO_2$ reduction is an expectation that people pursued but have not realized in a long period.

With gas temperature as high as 200° C. to 490° C., it has been debated whether the special FGD technology and equipment for ship are practical and economical, compared to land-based coal-fired industrial facility. To have a competitive utility, it requires that the total cost of ship FGD facility to be significantly lower than the total saving cost of using low-sulfur fuel for substitute. Currently available technologies have certain unsolved problems on economic and efficiency, some of which are discussed below.

One of the technologies uses a hollow fiber contactor as scrubber, and in this scrubber the ship exhaust after dust removal is scrubbed with seawater. The process is monitored by a control system that comprises a $SO_2$ consistency measurer, water quality measurer, and a PLC programming controller. The various controllers may monitor and record the real-time $SO_2$ consistency in processed ship exhaust, monitor and record discharged water quality, and control the water discharge respectively. For further details, see patent number 200710012371.1, published in China, Jan. 16, 2008, titled, 'A seawater scrubbing ship exhausts processing method.' This system has some problems as described below:

Firstly, the technology uses a hollow fiber contactor as scrubber. This hollow fiber contactor only tolerates tens of centigrade. It can not be used for high-temperature gas, especially for the ship engine exhaust with temperature as high as 200-490° C.

Secondly, pressure drop and resistance are very high when the hollow fiber contactor is used for scrubbing. Operation cost and energy expenditure would be quite high if additional booster fan is installed.

Another technology describes a scrubber for exhaust gases comprising a series of nested counter-flow passages including a hot plenum having a star-shaped section. Exhaust gases from the hot plenum surge through a liquid bath and flow in a reverse direction through an inclined array of flat, overlapping, spaced mixing vanes, causing turbulence in the exhaust gases and the formation of highly dispersed tiny bubbles, which enhance the solution of gaseous pollutants into the scrubbing liquid. Mist eliminator vanes strip entrained liquids from the exhaust gases. The hot plenum, reheats the exhaust gases to an unsaturated level. The scrubber is highly effective in reducing particulate matter, stripping sulfur dioxide and nitrogen dioxide from exhaust gases, and reducing the heat signature and visual evidence thereof.

This technology includes equipment comprising a scrubber device for reduction of particulate and gaseous contaminants from exhaust gases. Components of the scrubber includes: a co-axial nested inlet conduit, hot conduit, and outlet conduit for counter-flow passage of the exhaust gases; a tank containing a bath of scrubbing liquid, wherein ends of the hot and outlet conduits are operatively interconnected and immersed in the scrubbing liquid within the tank whereby the exhaust gases pass through the liquid bath; one or more sets of mixing vanes, and one or more sets of horizontal mist eliminator vanes. Said mixing vanes are located within the immersed end of the outlet conduit, and are adapted to generate turbulence in the exhaust gases to form very small bubbles. Said mist eliminator vanes are located in the outlet conduit downstream of the mixing vanes, and are adapted to remove droplet and mist from the exhaust gases.

The technology uses a method of scrubbing a stream of exhaust gases to reduce particulate and gaseous contaminants and to reduce the exhaust gas temperature comprising, (a) passing exhaust gases from a source through an elongated inlet conduit; (b) passing the exhaust gases in a counter-flow direction through a hot conduit surrounding the inlet conduit; (c) passing the exhaust gases through a liquid bath to cool the gases and retain particulate matter; (d) passing the exhaust gases in a counter-flow direction into an outlet conduit surrounding the hot conduit and having at least a partial common wall with the hot conduit; (e) passing the exhaust gases through one or more sets of mixing vanes adapted to redirect the gas stream direction and generate turbulence in the liquid bath, whereby fine bubbles are generated and entrained in the gas stream (f) passing the exhaust gases through one or more sets of mist eliminator vanes to substantially eliminate any entrained bubbles or moisture; (g) passing the exhaust gases along a heated surface of said common wall to raise the temperature of the exhaust gases above the dew point; and (h) exhausting the exhaust gases from the scrubber.

The major features of above method and equipment are: 1) Scrubbing $SO_2$ with high efficiency, where the operating pressure loss is less than six inches of water; and 2) The temperature of the discharged exhaust gas is raised at least 30° C. above the dew point. For further details, see U.S. Pat. No. 7,056,367, Jul. 6, 2006, titled, 'Method and apparatus for scrubbing gases, using mixing vanes'

Using seawater scrubbing to reduce the sulfur dioxide and other pollutant in exhaust emission mainly relies on some important conditions. One of the conditions is the temperature. The higher the temperature, the worse is the scrubbing effect. Another condition is the gas-liquid contact surface. The larger the surface, the better the scrubbing effect is.

As discussed above, an existing technology is based on 'exhaust pass through the scrubbing liquid tank', that is, bubbling scrubbing liquid to scrub and cool the high temperature exhaust gas. It uses 'mixed vane' to enlarge the gas-liquid contact surface. This bubbling scrubbing technical solution has some shortcomings when used for the high temperature exhaust gas of ship, as described below.

Firstly, it is difficult to overcome the conflict between scrubbing effect and operational cost. The bubbling scrubbing technology is minimally efficient in gas-liquid transfer.

Figure 4:
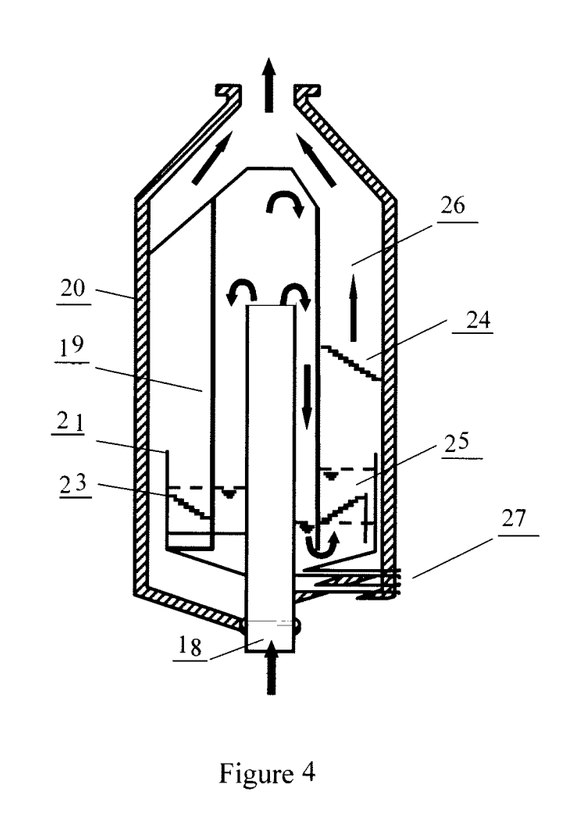
FIG. 4 demonstrates a conventional equipment for scrubbing gases.

In such technology, the transfer efficiency is decided by the size and amount of liquid handling of the bubbling unit which is usually called bubbling hood (refer to FIG. 4 of U.S. Pat. No. 7,056,367). However, the mentioned is limited by available space on the ship for exhaust gas scrubbing, and it employs a single large bubbling hood. This causes a low transfer efficiency. On the other hand, scrubbing or absorbing level of the bubbling scrubbing method is related to the depth of exhaust immersed in the liquid. The deeper in the liquid, the more bubbles emerge. Also, the longer the bubbles leave liquid, the larger the gas-liquid surface is, and consequently, the scrubbing or absorbing is more efficient. Pressure loss of the bubbling scrubbing operation method is the energy loss by the exhaust to overcome the liquid pressure. The scrubbing performs better as the pressure loss increases, but the running cost also rises. This indicates the conflict of scrubbing effect and running cost that is hard to solve.

The existing technology recites a pressure loss lower than 6 inches of water (152 mm) under the seawater scrubbing condition. Obviously, the depth of exhaust in the scrubbing liquid is then less than 6 inches. With such a shallow immerse, the overall gas-liquid contact surface is still extremely limited even if the 'mixed vanes' is added to form turbulence in the exhaust gases, forming highly dispersed tiny bubbles. As a result, the scrubbing and absorbing efficiency is very low. In order to reach better scrubbing performance, the exhaust immerse depth and pressure loss must increase, hence the energy consumption and running cost would rise accordingly. This is clearly not an ideal result.

Secondly, it is difficult to overcome the conflict between high temperature gas cooling and low temperature sulfur dioxide absorbing. The major purpose of seawater scrubbing is to absorb the sulfur dioxide. This invention plans to use one tank of water to carry both high temperature gas cooling process and scrubbing process. The high temperature gas is cooled while the temperature of scrubbing seawater becomes higher. Simultaneously, the heated seawater is used for scrubbing and absorbing the sulfur dioxide. This causes the sulfur dioxide absorbing to be inefficient. In order to increase the absorbing efficiency, the only way is to add much more scrubbing water, because it can lower the scrubbing seawater temperature increase. However, it also means greater energy consumption and running cost rises significantly. This process seems unable to accomplish both functions at one time.

Thirdly, it is difficult to overcome the conflict between decreasing running cost by employing anticorrosive elements and increasing manufacturing cost. A feature of the existing technology is that it adopts nested 'hot conduit' heat exchanger; 'passing the exhaust gases along a heated surface of said common wall to raise the temperature of the exhaust gases above the dew point'. This is designed for the purpose of decreasing the running cost and extending the operation life of the equipment, meanwhile, the exhaust gas is heated to prevent the equipment from corrosion. However, said hot conduit must have star-shaped cross-section or other complicated cross-section shape so that to increase heat conduct area, gather more heat, and re-heat the exhaust gas. Because the working condition of the heat exchanger is high-temperature, high-humidity, and strongly corrosive environment, it needs large quantity of corrosion resistant alloy materials, and this would certainly cost much at manufacture, and the total cost of this equipment must rise accordingly. The disadvantage seems to outweigh the gain in this result.

Fourthly, it is difficult to overcome the conflict between corrosion prevention and intensified corrosion for the gas re-heating. The said invention adopts nested 'hot conduit' heat exchanger technology under seawater scrubbing condition. It not only is unable to increase the reheated exhaust temperature higher than the acid dew point by 30° C., but also may make the temperature significantly lower than the dew point. The problem is that in the range of the dew point, the corrosivity gets stronger when the exhaust temperature is higher. The purpose of this technology is to prevent the corrosion, but the re-heating method for exhaust gas may only aggravate the corrosion. The result seems against the inventive purpose.

The existing technology has been experimented on ships for many years. Clearly, to solve the problem of ship engine high temperature (200-400° C.) exhaust treatment, the existing technologies have employed methods and equipment which are of low efficiency and are costly. The present invention aims to address the above discussed problems encountered by the prior art technologies, that has prevented an wide-spread deployment of the technology so far.

SUMMARY

Embodiments of the present invention intend to overcome the shortcomings of existing ship flue gas scrubbing equipment. The present application provides a highly efficient ship flue gas scrubbing equipment for high-temperature gas condition and limited usable space.

Embodiments of the present invention also intend to overcome the shortcomings of existing ship flue gas scrubbing method. The present application provides a ship flue gas scrubbing method which first cools the high temperature exhaust gas and then passes the gas through fillings to scrub. It separates the cooling and scrubbing into two steps to achieve better results.

The common object of the ship flue gas scrubbing equipment and method in this invention is: high pollutant reduction efficiency, low running cost, long performance life, to realize the technical and economic goal that the total cost of ship FGD facility is significantly lower than the total cost of using low-sulfur fuel for substitute.

The technical solution of the ship flue gas scrubbing equipment of this invention is: it comprises a shell, in which a scrubbing section contains fillings. The scrubbing section is fixed inside the upper portion of the shell. A water tank with a seawater outlet lies under the scrubbing section inside the shell. A smoke pipe leads the to-be-scrubbed exhaust gas into the shell from the outside. One end of the smoke pipe is the gas inlet outside the shell. The other end of the smoke pipe is the gas lead-in port inside the shell. The gas lead-in port coincides with at inner wall of the shell or extends into the shell, and it lies between the scrubbing section and water tank. A cooler is used for cooling the high temperature gas lies along the gas pathway between the gas lead-in port of the smoke pipe and the scrubbing section. The scrubbing seawater inlet is above the scrubbing section. At the top of the shell is clean gas outlet.

In said ship flue gas scrubbing equipment, the cooler may have a flow equalization cooling section, that lies between the gas lead-in port and the scrubbing section. The flow equalization cooling section comprises high temperature resistant components and may be fixed on the wall of the shell, or may be fitted to the wall of the shell by built-in fittings.

The cooler may be a tube cooler or a sheet cooler installed on the smoke pipe or inside the pipe cavity. Alternatively, the cooler is a spray system installed on the smoke pipe or on the shell. The spray system is used for spraying cooling water to the high temperature gas.

The gas lead-in port inside the shell is fixed at the bottom portion of the shell and reaches inside the shell. The opening of the gas lead-in port may be covered by a water collector cover that is used for preventing the scrubbing seawater from entering the smoke pipe. The gas lead-in port inside the shell may be a hole on the wall of the shell, or an exit of the smoke pipe that is fixed on the wall of the shell.

The water tank comprises lower wall of the shell, bottom portion of the shell, and a surface of smoke pipe or clapboard outside the smoke pipe. The water tank has water level below the opening of the gas lead-in port.

The high temperature resistance components that make up the said flow equalization cooling section may be high temperature resistant inorganic material, selected from metal, pottery or carbon fiber. Said flow equalization cooling section includes high temperature resistant fillings held in a supporting frame. The supporting frame is directly fixed on the wall of the shell or is fixed by built-in fittings. Said flow equalization cooling section may include high temperature resistant grizzly screen or/and high temperature resistant perforated plate which is directly fixed on the wall of the shell or fixed by built-in fittings.

Said scrubbing section within the shell includes fillings held by a supporting frame. The fillings supporting frame is directly fixed on the wall of the shell or fixed by built-in fittings. The fillings in the said scrubbing section is a polymer material that is selected from polypropylene, polyethylene, or ABS engineering plastics. Said scrubbing section may have a fixed a water distributor which distributes the scrubbing seawater evenly to the downside; the said water distributor comprising a set of water pipes or/and a set of sinks. The upward side of the said water distributor may have a defogger installed to eliminate fog drops in exhaust gas.

The main steps of the ship flue gas scrubbing method using seawater to scrub pollutants (which mainly is sulfur dioxide) in the ship exhaust emission is described below.

The method starts with leading the engine exhaust gas into the scrubber, and making the exhaust gas flow from downside to upside in the scrubber.

The next step is injecting scrubbing seawater into the scrubber from the scrubbing seawater entrance which is at the upper scrubbing section of the scrubber. The scrubbing seawater is made to flow from upside to downside in the scrubber.

The next step is scrubbing. The scrubbing seawater from the upper scrubber flows through the filling scrubbing section, contacts with the cooled exhaust gas that goes upward, and performs scrubbing in a counter-current way. Before scrubbing, the high temperature exhaust gas is cooled by the cooler. The scrubbing seawater flows downward through the cooler to reduce the temperature of the high temperature exhaust gas, then the cool gas goes upward to the scrubbing section.

After scrubbing, the clean gas goes upward to the clean gas outlet and gets discharged from it.

The seawater after scrubbing falls to the water tank and gets discharged from the seawater outlet.

To increase the efficiency of the scrubbing method, the gas and scrubbing seawater are allowed to contact and mix sufficiently at the gas-liquid contact surface that is formed in fillings of the scrubbing section. This ensures a thorough scrubbing and removal of the $SO_2$ from the exhaust gas.

Furthermore, in the clean gas discharging process, the clean gas is passed through a defogger to reduce fog drops and then discharged from clean gas outlet.

Additionally, in the method described above, the running pressure loss is less than 110 millimeters of water.

BRIEF DESCRIPTION OF THE FIGURES

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Technical principle and overall effect of the ship flue gas scrubbing method and equipment of this invention are described below.

The natural seawater possesses strong dissolving and absorbing abilities for sulfur dioxide. For this reason, it can be used for scrubbing and cleaning the flue gas to reduce sulfur dioxide and other pollutant in marine and industrial firing facility exhaust. The applied ship seawater scrubbing equipment requires small size and high efficiency. Because of the limited space on-board a ship and short reaction time of this art, the corresponding equipment has to have a persuasive high total absorbing efficiency, as well as very high absorbing speed. It implies that the scrubbing and absorbing efficiency must be very high; otherwise the equipment have very little or no practical utility. To have high scrubbing and absorbing efficiency, the key conditions are reaction temperature and contact area. The absorbing effect is worse if the reaction temperature is higher, and the absorbing effect is better if the gas-liquid contact area is larger. In order to reach the desired result, this invention employs the method that first cools the high temperature gas, then scrubs and absorbs, making cooling and scrubbing absorbing as two separate functions, resulting in a high efficiency. The total cost of ship flue gas scrubbing equipment and method described in this invention is significantly lower than the total cost of using low-sulfur fuel for substitute.

The individual steps are discussed in greater detail below.
Cooling:

The ship flue gas scrubbing method and equipment can be applied in high temperature condition with exhaust gas having temperature as high as 490° C. ejected from diesel fuel engine on ships. The high temperature gas with sulfur dioxide may not be scrubbed and absorbed before cooling further. The components, especially the fillings are easily damaged if the high temperature gas enters the scrubbing area directly. Hence, the upside of the scrubber is a scrubbing functional area and the downside of it is a flow equalization cooling section. The high temperature gas goes upward to pass the flow equalization cooling section and then to the scrubbing functional area to contact with scrubbing liquid and be scrubbed. The said flow equalization cooling section is at the downside of the scrubber. The cooling area comprises high temperature resistant grizzly screen or/and fillings. It passes the high temperature gas from inlet pipe through the grizzly screen or/and fillings of this flow equalization cooling functional area, cool the gas and spread the gas flow. The said flow equalization cooling section at downside of the scrubber is a functional area comprising high temperature resistance perforated plate or/and fillings. It passes the high temperature gas from inlet pipe through the perforated plate or/and fillings of this flow equalization cooling functional area, cool the gas and spread the gas flow. The gas inlet pipe cross the water tank and a portion of the gas inlet is immersed in the scrubbing liquid, and this design is part of the cooling functional area. The above design results in optimal cooling effect.

Scrubbing:

The scrubbing functional area comprises a fillings section, the seawater scrubbing liquid is distributed evenly to the fillings from above to below by the water distributor and wash the fillings. On the other hand, the cooled gas passes through the fillings section from below to above; because the scrubbing seawater is distributed at fillings and form a huge gas-liquid contact surface where the scrubbing and absorbing efficiency is very high. Moreover, the scrubbing art in this invention adopts a counter-current arrangement in which the scrubbing seawater goes downward through the scrubbing section and the gas goes upward through the scrubbing section. The gas eventually contacts the fresh seawater with strongest alkalinity and lowest temperature. So, the scrubbing and absorbing efficiency for sulfur dioxide can be considerably high. In the mean time, the fillings scrubbing section employed by this invention significantly reduces resistance for the passing gas to ensure the equipment with low running cost and high absorbing efficiency.

As a result of taking the described design and technical solution, this invention overcomes many shortcomings of the existing technologies. The main characteristic advantages and results of this ship flue gas scrubbing equipment and method are described below.

The invention is characterized by high scrubbing efficiency and low running cost. This invention adopts counter-current scrubbing with fillings method, its gas-liquid contact area is at least thousands times of the bubbling scrubbing method. The high efficiency scrubbing can reduce 99% sulfur oxides, 20% nitrogen oxides, and 80% particle. The pressure loss is lower than 110 millimeters of water.

It has important significance to international shipping business for the environmental objectives. IMO published restrictions for SECA (SOx Emission Control Area) that the sulphur content of fuel oil used onboard ships must not exceed 1.5%. Alternatively, ships must fit an exhaust gas cleaning system to make the sulphur content of exhaust emissions equal to it when ships use fuel oil with sulphur content not exceed 1.5%, that is, the 'desulphurize equivalent fuel oil sulphur content' must not exceed 1.5%. Other international organizations have been aiming for a 0.1% fuel oil sulphur content goal. Currently, global average sulphur content of heavy oil is approximate 3%, so the scrubbing efficiency must be 50% to reach the desulphurization equivalent fuel oil sulphur content 1.5% goal, and 96.7% to reach the desulphurization equivalent fuel oil sulphur content 0.1% goal.

A second inventive feature is that high temperature gas cooling and low temperature $SO_2$ absorbing are carried in different steps.

The high temperature gas must be cooled so that the $SO_2$ in it can be absorbed efficiently. This invention employs a cooler. The flow equalization cooling section in the cooler is positioned below the scrubber. The fresh scrubbing seawater passes the scrubbing section to absorb $SO_2$ in the cooled exhaust gas, and then passes the flow equalization cooling section to cool the high temperature gas. The flow equalization cooling and absorbing are carried in two different functional areas at separate steps, and do not have impact on each other. The cooling effect and $SO_2$ absorbing efficiency reaches to optimal outcomes respectively. As described previously, using the counter-current scrubbing method in this invention, temperature of seawater at the gas outlet is the lowest, and consequently the absorbing ability of seawater is the best. As a result, this leads to extremely high $SO_2$ absorbing performance, and the significant advantage of the two-stage cooling and absorbing method is well demonstrated further.

A third characteristic feature of the invention is the accomplishment of the simultaneous low running cost and low manufacture cost.

High efficient heat exchanger requires tremendous thermal capacity and huge conduction heating surface. It may not be installed on ships because of its enormous size. This invention adopts the non-re-heating exhaust discharging way, as well as the mentioned high efficient fillings scrubbing technology. Therefore, the running cost and manufacture cost for the equipment are both reduced obviously.

A fourth characteristic feature of the invention is that the conflict between re-heat anticorrosion and operationally intensified corrosion is solved.

This invention employs non-re-heat exhaust discharging and avoids the re-heating heat exchanger. Existing re-heating heat exchanger is costly and results in an opposite outcome of its invention purpose. As mentioned above, temperature of seawater at the gas outlet is the lowest, and consequently corrosion ability of the exhaust is the weakest. Hence, corrosion resistant materials with less cost can be chosen to extend the equipment life.

To conclude, this invention realize high efficiency, desirable performance, and reliability. On the other hand, it reduces manufacturing cost and running cost significantly.

Figure 1:
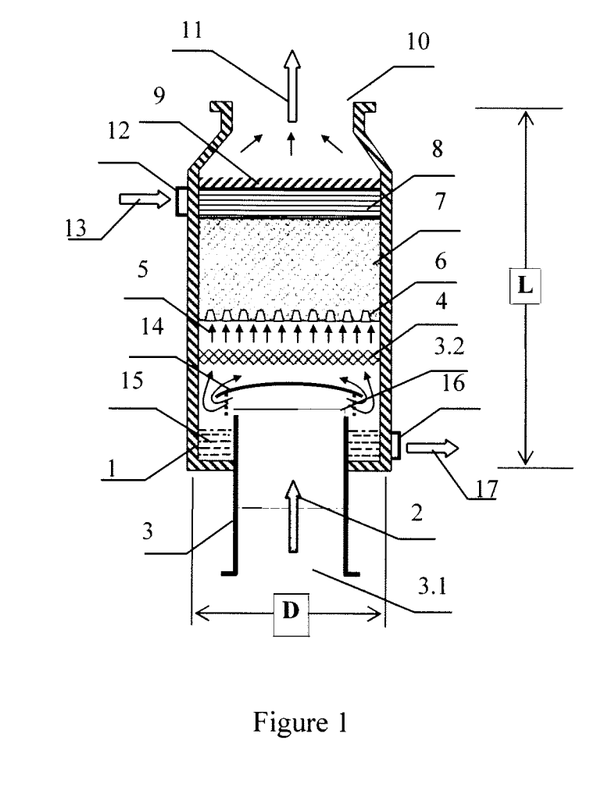
FIGS. 1 and 2 demonstrate two embodiments of a ship flue gas scrubbing equipment, according to the present invention.
Figure 2:
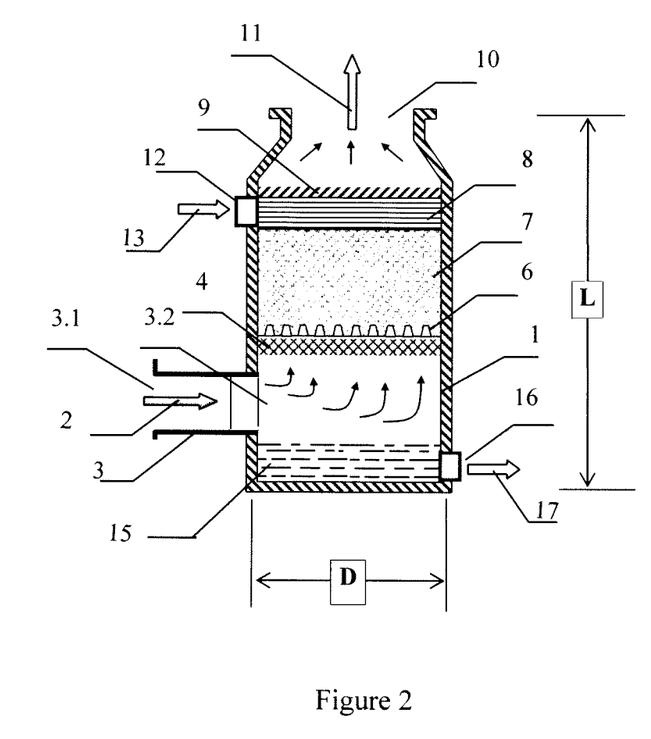

FIG. 1 demonstrates a ship flue gas scrubbing equipment, according to an embodiment of the present invention. The equipment includes a shell 1, and a smoke pipe 3. High temperature gas 2 enters into the smoke pipe 3. Smoke pipe 3 has a gas inlet 3.1 outside the shell 1, and a gas lead-in port 3.2 inside the shell 1. A cooler 4 with a flow equalization cooling section 4' is located within shell 1. Cooled low temperature gas 5 goes upwards from cooler 4 to the scrubbing fillings held by a fillings bearing rack 6. The gas gets scrubbed in scrubbing section 7. a water distributor 8 distributes seawater 13 coming in from scrubbing seawater inlet 12. Scrubbed clean gas 11 goes out of clean gas outlet 10, which may have a defogger 9. Water tank 15 at the bottom of the shell may have a water collector cover 14. Seawater is discharged after scrubbing through an outlet 16. In FIGS. 1 and 2, D is the length of the cross-section of rectangular-shaped scrubber; and L is the height of the scrubber.

In FIG. 1, the gas lead-in port 3.2 inside the shell 1 is fixed at the bottom portion of the shell 1 and has an opening coinciding with the exit of the smoke pipe 3 inside the shell 1, suitable for situations where the flue gas enters the scrubber vertically to the upside. The cooler 4 has a flow equalization cooling section 4'. The cooler 4 is located between the gas lead-in port 3.2 and the scrubbing section 7.

FIG. 2 demonstrates another embodiment of the ship flue gas scrubbing equipment according to the present invention. The gas lead-in port 3.2 inside the shell 1 is an exit of the smoke pipe 3 that is fixed on the wall of the shell 1, suitable for situations where the flue gas enters the scrubber horizontally and then goes upside. The cooler 4 has a flow equalization cooling section 4', that lies between the gas lead-in port 3.2 and the scrubbing section 7.

Figure 3:
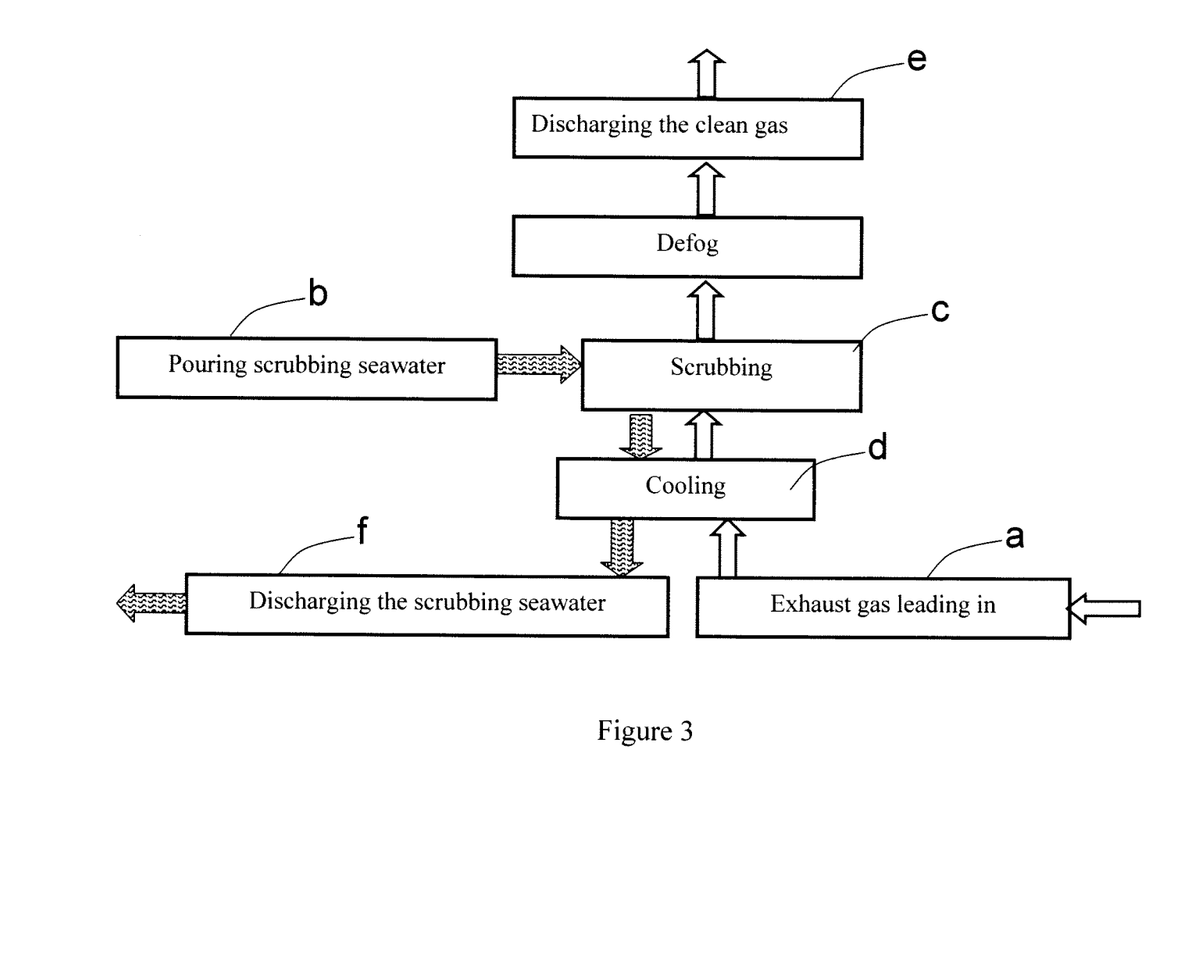
FIG. 3 shows a flowchart of the ship flue gas scrubbing method, according to an embodiment of the present invention.

FIG. 3 shows a flowchart of the ship flue gas scrubbing method, according to the present invention. In FIG. 3, block a is Exhaust gas leading in, block b is pouring scrubbing seawater, block c is scrubbing, block d is Cooling, block e is discharging the clean gas, and block f is discharging the scrubbing seawater.

FIG. 4 demonstrates the existing technology of U.S. Pat. No. 7,056,367 which includes: co-axial nested inlet conduit, hot conduit, and outlet conduit, counter-flow passage of the exhaust gases, a tank containing a bath of scrubbing liquid, ends of the hot and outlet conduits are operatively interconnected and immersed in the scrubbing liquid, hot conduit is generally star-shaped, in order to provides sufficient re-heat to the exhaust gases to elevate the exhaust gas temperature beyond the dew point by at least 30° C. In FIG. 4, 18 is inlet conduit and gas inlet; 19 is hot conduit; 20 is gas outlet; 21 is a tank containing a bath of scrubbing liquid; 22 is scrubbing liquid; 23 is mixing vanes, 24 is mist eliminator vanes, 25 is mixing exhaust and scrubbing liquid in the tank, 26 is scrubbing gas re-heat area, and 27 is scrubbing liquid inlet and outlet.

Figure 5:
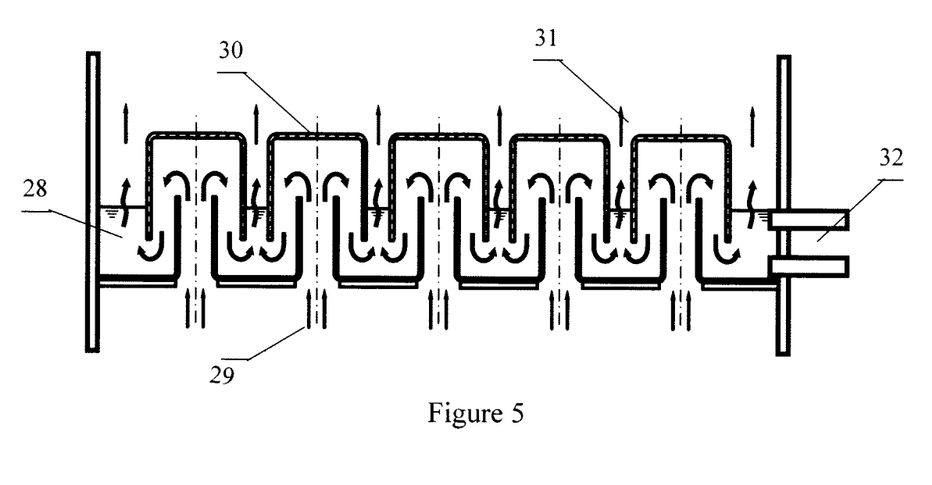
FIG. 5 demonstrates a conventional bubbling scrubber.

FIG. 5 demonstrates a conventional bubbling scrubber. There are 5 bubbling hood units in this example. In FIG. 5, 28 is scrubbing liquid, 29 is entering gas, 30 is bubbling hood unit, 31 is discharging gas, and 32 is scrubbing liquid inlet and outlet.

APPLICATION EXAMPLES

Further description for the ship flue gas scrubbing equipment and method are given below combining figures and examples.

A. Examples for the Ship Flue Gas Scrubbing Equipment

Example 1

As depicted in FIG. 1, an application in which the gas lead-in port 3.2 is fixed at the bottom portion of the shell 1 and reaches to the exit of the smoke pipe 3 inside the shell 1. It maintains the smoke pipe 3 staying above acidic seawater surface of the water tank 15, that is, the exhaust gas does not enter the acid seawater. It is suitable for situations where the flue gas is lead in vertically. It comprises a shell 1, a scrubbing section 7 which contains fillings. A water tank 15 with a seawater outlet 16 lies in the lower portion of the shell. On the wall of the said shell 1, there exists a smoke pipe 3 which lead the to-be-scrubbed exhaust gas into the shell 1 from the outside. One end of the smoke pipe 3 is the gas inlet 3.1, the other end is the gas lead-in port 3.2; the gas lead-in port 3.2 extends into the shell 1, and it lies between the scrubbing section 7 and water tank 15; the cooler 4 which used for cooling the high temperature gas 2 lies on the gas passage that between the outside-shell gas inlet 3.1 of smoke pipe 3 and the scrubbing section 7; the scrubbing seawater inlet 12 is above the scrubbing section 7; the top of the shell 1 is clean gas outlet 10.

The said cooler 4 has a flow equalization cooling section 4' and lies between the gas lead-in port 3.2 and the scrubbing section 7; the flow equalization cooling section 4' is made up of high temperature resistance components and be fixed on the wall of shell 1, alternatively it can be fixed by built-in fittings on the wall of shell 1.

Figure 6:
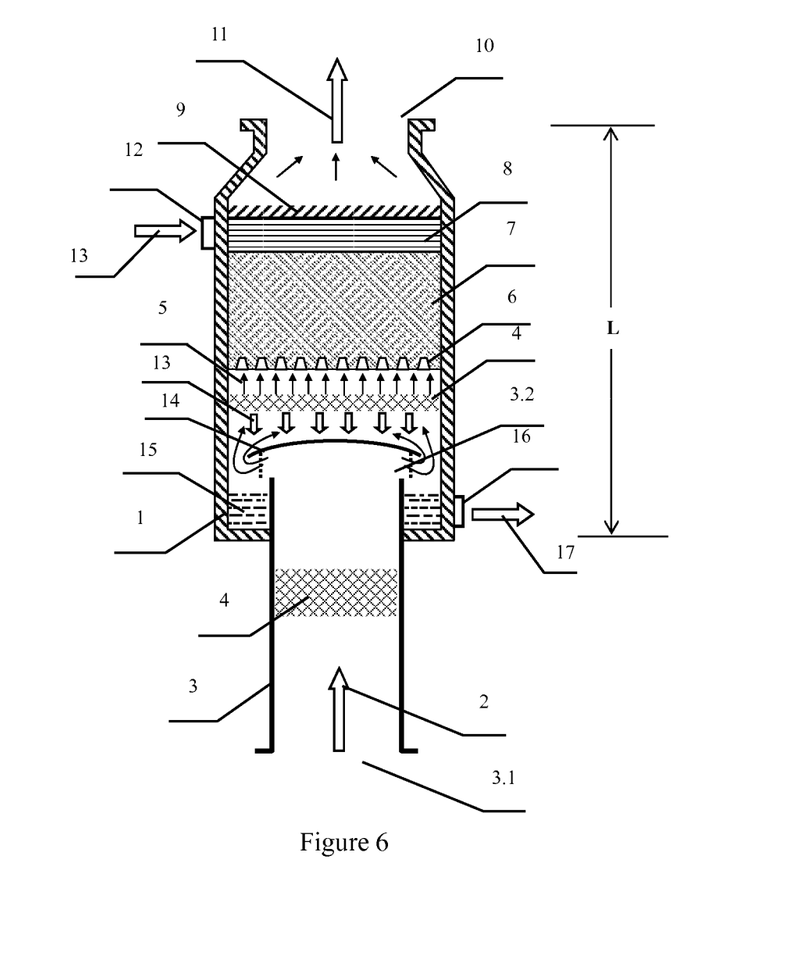
FIG. 6 demonstrates the third embodiments of a ship flue gas scrubbing equipment, according to the present invention.

The said cooler 4 is a tube cooler or sheet cooler installed on the smoke pipe 3. Another application may also be: the said cooler 4 is tube cooler or sheet cooler (as shown in FIG. 6) installed inside the smoke pipe 3 cavity. Alternatively, the said cooler 4 is the spray system installed on the smoke pipe 3 or on the shell 1 which used for spraying cooling water to the high temperature gas 2; the spray system may be a set of sprayer.

The said gas lead-in port 3.2 inside the shell 1 is fixed at the bottom portion of the shell 1 and reaches to the exit of the smoke pipe 3 inside the shell 1, against the exit is a water collector cover 14 that used for preventing the scrubbing seawater from entering the smoke pipe 3.

The said gas lead-in port 3.2 inside the shell 1 is a hole on the wall of the shell 1, or an exit of the smoke pipe 3 that fixed on the wall of the shell 1.

The said water tank 15 comprises lower wall of the shell 1, bottom portion of the shell 1, or clapboard outside the smoke pipe 3; the clapboard is able prevent wall of the smoke pipe 3 from corrosion.

The high temperature resistant components that make up the said flow equalization cooling section 4' are inorganic high temperature resistant materials. This example employs pottery, metal or carbon fiber materials may also be chosen; the flow equalization cooling section 4' high temperature resistance components include high temperature resistant fillings and high temperature resistant fillings supporting frame; the high temperature resistant fillings supporting frame is directly fixed on the wall of the shell 1 or fixed by built-in fittings.

The flow equalization cooling section 4' in other application example may include high temperature resistant grizzly screen or high temperature resistance perforated plate, or the combination of both, which directly fixed on the wall of the shell 1 or fixed by built-in fittings.

The said scrubbing section 7 includes fillings and a filling supporting frame; the fillings supporting frame is directly fixed on the wall of the shell 1 or fixed by built-in fittings. The fillings in the said scrubbing section 7 is polymer material select from polypropylene, polyethylene, or ABS engineering plastics. Employing non-high temperature resistant material may save plenty of cost compared to using high temperature resistant material, so that the manufacture cost is reduced significantly.

Above the said scrubbing section 7 there is a water distributor 8 which can distribute the scrubbing seawater evenly to the downside; the said water distributor 8 comprising a set of water pipes or a set of sinks, or the combination of both; on the upward side of the said water distributor 8 there installed a defogger 9 to eliminate fog drops in exhaust gas.

The final discharging scrubbing liquid would be discharged to the ocean if it complies with the environmental standards of the sea area that the ship passes or/and stays, would be reserved in the waste water cabin or be discharged after further treatment if it does not comply with relevant standards.

The ship in this example is with diesel fuel engine power 7150 KW, 9700 hp, 127 rpm, using oil fuel with sulfur content 3%. The key parameters are:

| | |
|---|---|
| Scrubber length D (mm) | 2523 |
| Scrubber height L (mm) | 8750 |
| Inlet gas volume (Kg/h) | 48281 |
| Inlet gas temperature ° C. | 200~490 |
| Inlet $SO_2$ (Kg/h) | 70 |
| Inlet smoke and dust (g/h) | 245 |
| Inlet NO$x$ (g/KWh) | 18.56 |
| Scrubbing seawater volume (Ton/h) | 96 |
| Outlet discharged $SO_2$ (Kg/h) | 0.68 |
| Outlet discharged smoke and dust (g/h) | 49 |
| Outlet gas temperature | 20~49 |

-continued

| | |
|---|---|
| Outlet discharged NOx (g/KW · h) | 14.8 |
| International restrictions of NOx discharging (g/KW · h) | ≦17.0 |

Example 2

Depicted in FIG. 2 is another application for this ship flue gas scrubbing equipment. The difference to Example 1 is that the gas lead-in port 3.2 inside the shell 1 is at the shell 1, and it is an exit of the smoke pipe 3 that fixed on the wall of the shell 1. It maintains the smoke pipe 3 staying above acidic seawater surface of the water tank 15, that is, the exhaust gas does not enter the acid seawater. It is suitable for situations where the flue gas enters the scrubber horizontally and then goes upside. The water tank 15 comprises of wall and bottom portion of the shell 1 which below the horizontal cross-section of the inside-shell gas lead-in port 3.2 lower edge.

Example 3

Another embodiment for this ship flue gas scrubbing equipment has a cooler 4, where the cooler is tube cooler or sheet cooler installed on the smoke pipe 3, or installed inside the pipe cavity.

Example 4

Another embodiment for this ship flue gas scrubbing equipment has a cooler 4, where the cooler is the spray system installed on the smoke pipe 3 or on the shell 1 which used for spraying cooling water to the high temperature gas 2; this spray system is a set of sprayer.

B. Example Ship Flue Gas Scrubbing Method

Example 5

As demonstrated in the flowchart in FIG. 3, it is a ship flue gas scrubbing method using seawater to scrub ship exhaust pollutant primarily $SO_2$. The example method comprises the following steps
a. Exhaust gas leading in: The engine exhaust gas is lead into the scrubber. The exhaust gas is made to flow from downside to upside in the scrubber.
b. Injecting scrubbing seawater: The scrubbing seawater is injected into the scrubber from the scrubbing seawater entrance which is at the upper scrubbing section of the scrubber. The scrubbing seawater is made to flow from upside to downside in the scrubber.
c. Scrubbing: The scrubbing seawater that ejected from the upper scrubber flows through the filling scrubbing section, makes contact with the cooled exhaust gas that goes upward. The scrubbing is performed in a counter-current way.
d. Cooling: The high temperature exhaust gas is cooled by the cooler. The scrubbing seawater is made to flow downward through the cooler to reduce the temperature of the high temperature exhaust gas, then the cool gas goes upward to the scrubbing section.
e. Discharging the clean gas: The clean gas that after scrubbing goes upward to the clean gas outlet and gets discharged from it.
f. Discharging the scrubbing seawater: The seawater after scrubbing falls to the water tank and gets discharged from the seawater outlet.

In the said scrubbing step, the sufficient scrubbing method for the upward cool gas is: let the gas and scrubbing seawater contact and mix sufficiently at the gas-liquid contact surface that is formed in fillings of the scrubbing section, make the upward gas be scrubbed thoroughly, and remove the $SO_2$ in it. In the said lean gas discharging step, the clean gas is passed through a defogger to reduce fog drops and then discharged from clean gas outlet.

In the said scrubbing method, the running pressure loss is less than 110 millimeters of water.

The protection range of this invention is not limited by examples above. It should be understood that processes and techniques described herein are not inherently related to any particular apparatus and may be implemented by any suitable combination of components. Further, various types of general purpose devices may be used in accordance with the teachings described herein. The present invention has been described in relation to particular examples, which are intended in all respects to be illustrative rather than restrictive. Those skilled in the art will appreciate that many different combinations will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

The invention claimed is:
1. A ship flue gas scrubbing equipment for removing $SO_2$ from flue gas exhausted from a ship engine, comprising:
a shell, including:
 a scrubbing section containing fillings, located at an upper portion of the shell;
 a seawater distributor located above the scrubbing section;
 a water tank with a seawater outlet, located at a lower portion of the shell beneath the scrubbing section;
 a scrubbing seawater inlet above the scrubbing section and configured to deliver scrubbing seawater to the seawater distributor; and
 a clean gas outlet at the top of the shell;
 a smoke conduit coupled to a wall of the shell, the smoke conduit leading high temperature gas into the shell from outside, the smoke conduit including:
 a gas inlet port extending out from the shell, and
 a gas lead-in port with an opening located between the scrubbing section and the water tank; and
 a cooler positioned inside the shell under the scrubbing section and used for cooling the high temperature gas, wherein the cooler is located along a pathway of the high temperature gas between the gas inlet port of the smoke conduit and the scrubbing section of the shell; and,
 wherein the seawater distributor is configure to direct scrubbing seawater received from the seawater inlet to flow downward first through the scrubbing section for removing sulfur from the gas and then through the cooler to reduce the temperature of the high temperature gas; and the cooler comprises one of the following:
- a tube cooler installed on the smoke conduit or inside a cavity of the smoke conduit;
- a sheet cooler installed on the smoke conduit or inside a cavity of the smoke conduit.

2. The ship flue gas scrubbing equipment of claim 1, wherein the gas lead-in port inside the shell is fixed at the bottom portion of the shell, and the exit of the gas lead-in port is covered by a water collector cover used for preventing the scrubbing seawater from entering the smoke conduit.

3. The ship flue gas scrubbing equipment of claim 2, wherein the water tank comprises a lower portion of the wall of the shell, and a portion of an outer surface of the smoke conduit extending into the shell.

4. The ship flue gas scrubbing equipment of claim 3, wherein a level of water in the water tank is below the opening of the gas lead-in port.

5. The ship flue gas scrubbing equipment of claim 1, wherein the fillings in the scrubbing section comprise polymer material.

6. The ship flue gas scrubbing equipment of claim 1, wherein the seawater distributor is configured to distribute the scrubbing seawater evenly to the downside, and comprises a set of water conduits or/and a set of sinks.

7. The ship flue gas scrubbing equipment of claim 6, wherein the seawater distributor includes a defogger to eliminate fog drops in exhaust gas.

* * * * *

UNITED STATES PATENT AND TRADEMARK OFFICE
CERTIFICATE OF CORRECTION

PATENT NO. : 8,500,893 B2  Page 1 of 1
APPLICATION NO. : 12/304751
DATED : August 6, 2013
INVENTOR(S) : Sigan Peng It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 121 days.

Signed and Sealed this
Fifteenth Day of September, 2015

Michelle K. Lee
*Director of the United States Patent and Trademark Office*